US012260785B2

(12) United States Patent
Pölker et al.

(10) Patent No.: US 12,260,785 B2
(45) Date of Patent: Mar. 25, 2025

(54) IDENTIFICATION STRIP, MARKING SYSTEM AND METHOD

(71) Applicant: PHOENIX CONTACT GmbH & Co. KG, Blomberg (DE)

(72) Inventors: Thomas Pölker, Detmold (DE); Joachim Jacke, Bad Driburg (DE); Heinz Reibke, Bad Salzuflen (DE)

(73) Assignee: PHOENIX CONTACT GmbH & Co. KG, Blomberg (DE)

( * ) Notice: Subject to any disclaimer, the term of this patent is extended or adjusted under 35 U.S.C. 154(b) by 252 days.

(21) Appl. No.: 17/431,991

(22) PCT Filed: Feb. 19, 2020

(86) PCT No.: PCT/EP2020/054341

§ 371 (c)(1),
(2) Date: Aug. 18, 2021

(87) PCT Pub. No.: WO2020/178026

PCT Pub. Date: Sep. 10, 2020

(65) Prior Publication Data

US 2022/0139269 A1 May 5, 2022

(30) Foreign Application Priority Data

Mar. 5, 2019 (BE) .................................. 2019/5135
Mar. 5, 2019 (DE) ..................... 10 2019 105 541.5

(51) Int. Cl.
*G09F 3/12* (2006.01)
*G09F 3/16* (2006.01)
*G09F 3/20* (2006.01)

(52) U.S. Cl.
CPC .................. *G09F 3/12* (2013.01); *G09F 3/16* (2013.01); *G09F 3/205* (2013.01)

(58) Field of Classification Search
CPC ....... H01R 9/2683; G09F 3/06; G09F 3/0295; G09F 3/205; G09F 3/16; G09F 3/12; G09F 7/06
See application file for complete search history.

(56) References Cited

U.S. PATENT DOCUMENTS 6,026,603 A * 2/2000 Kump ..................... G09F 3/204
40/661.03
6,266,906 B1 * 7/2001 Nagel ..................... G09F 3/204
40/649
(Continued)

FOREIGN PATENT DOCUMENTS

CN 103236223 A 8/2013
CN 103730060 A 4/2014
(Continued)

OTHER PUBLICATIONS

International Preliminary Report on Patentability issued on Sep. 16, 2021 in PCT Application No. PCT/EP2020/054341.

*Primary Examiner* — David R Dunn
*Assistant Examiner* — Christopher E Veraa
(74) *Attorney, Agent, or Firm* — Occhiuti & Rohlicek LLP

(57) ABSTRACT

Identification strip for an electrical installation, —having a marking area that is designed to be printed by way of a pressing device, —having a clamping area that is designed to engage in a fastening groove, wherein the marking area and the clamping area comprise a first plastic, characterized in that—the marking area and/or the clamping area has/have at least one adhesion area that comprises a second plastic, —wherein the second plastic is more flexible than the first plastic so as to increase static friction.

11 Claims, 5 Drawing Sheets

(56) References Cited

U.S. PATENT DOCUMENTS

| | | | | |
|---|---|---|---|---|
| 6,708,436 | B2 * | 3/2004 | Nagel | G09F 3/204 248/223.41 |
| 8,857,087 | B1 * | 10/2014 | Wildrick | G09F 3/16 40/661.03 |
| 8,863,415 | B2 * | 10/2014 | Muraco | G09F 3/205 40/1.5 |
| 2015/0040447 | A1 * | 2/2015 | Ganster | H01R 9/2683 40/647 |
| 2017/0148362 | A1 * | 5/2017 | Pizzi | H01B 7/368 |
| 2017/0282431 | A1 * | 10/2017 | Speith | G09F 3/0295 |
| 2018/0327155 | A1 * | 11/2018 | Groll | F16L 3/137 |
| 2021/0225204 | A1 * | 7/2021 | Hughes | G09F 3/0295 |

FOREIGN PATENT DOCUMENTS

| | | | |
|---|---|---|---|
| CN | 206115873 | U | 4/2017 |
| CN | 107073784 | A | 8/2017 |
| DE | 102009014694 | A1 | 10/2010 |
| DE | 102015109020 | A1 | 3/2016 |
| DE | 202015102586 | U1 | 5/2016 |
| DE | 202017102224 | U1 | 7/2018 |
| RU | 2616449 | C2 | 4/2017 |
| RU | 2673582 | C2 | 11/2018 |
| WO | 9952092 | A1 | 10/1999 |

* cited by examiner

IDENTIFICATION STRIP, MARKING SYSTEM AND METHOD

CROSS-REFERENCE TO RELATED APPLICATIONS

This application is a national phase under 35 U.S.C. 371 of International Application No. PCT/EP2020/054341 filed on Feb. 19, 2020, which claims priority to German Application No. 10 2019 105 541.5 filed on Mar. 5, 2019 and Belgian Application No. 2019/5135 filed on Mar. 5, 2019, the contents of all of which are hereby incorporated by reference in their entireties.

The present invention relates to an identification strip for an electrical installation, having a marking area that is designed to be printed by way of a printing device, having a clamping area that is designed to engage in a fastening groove, wherein the marking area and the clamping area comprise a first plastic. The invention also relates to a marking system having an identification strip and to a method for producing an identification strip.

Identification strips for electrical installations are used, for example, to identify the assignment of terminals or to designate components.

To fasten to an object to be marked, the identification strips can be clamped into a groove provided for receiving the identification strip and latched there. It is important that the identification strip remains in its position in the fully mounted state in order to ensure permanent assignment of the designated terminals, connections, or objects.

Known identification strips have the disadvantage that they tend to slip within the receiving or fastening groove. For example, due to environmental influences, vibrations, or improper maintenance of the electrical installation marked using the identification strip, the identification strip may slip within a receiving groove or completely fall out or be driven out of a receiving groove.

Against this background, technical problem addressed by the invention is that of specifying an identification strip for an electrical installation that does not have the disadvantages described above or at least to a lesser extent, and, in particular, allows reliable fastening to an associated fastening groove. Furthermore, a marking system having such an identification strip and a method for producing an identification strip are to be specified.

The technical problem described above is solved by an identification strip according to claim 1, a marking system according to claim 10 and a method according to claim 11. Further embodiments of the invention can be found in the dependent claims and the following description.

According to a first aspect, the invention relates to an identification strip for an electrical installation, having a marking area that is designed to be printed by way of a printing device, having a clamping area that is designed to engage in a fastening groove, wherein the marking area and the clamping area comprise a first plastic. The marking area and/or the clamping area has/have at least one adhesion area that comprises a second plastic, wherein the second plastic is more flexible than the first plastic so as to increase static friction.

The adhesion area accordingly forms slip protection or serves to prevent slip, provided that the identification strip is received in an associated fastening groove of a fastening object or fastening body. In this way, it can be ensured that the identification strip reliably remains in its originally intended mounting position and does not slip or is not driven out of the groove due to vibrations or the like.

When it is said in the present case that the second plastic is more flexible than the first plastic, this means, in particular, that the second plastic has a lower Shore hardness than the first plastic.

The first plastic can be, for example, a thermoplastic, such as a polyamide PA66, PA6, PA66/6, PA6/66, PA 4.6, PA10, PA12, PA6.10, polycarbonate, polybutylene terephthalate (PBT), polycarbonate/polybutylene terephthalate (PBT/PC), polyethylene terephthalate (PET), acrylonitrile butadiene styrene copolymer (ABS), polycarbonate/acrylonitrile butadiene styrene (PC/ABS), polycarbonate/acrylonitrile styrene acrylate copolymer (PC/ASA), polyvinyl chloride (PVC), polypropylene (PP), polyethylene (PE), or the like. The first plastic can be, for example, a thermoset, such as epoxy resin (EP resin), polyester resin (UP resin), phenolic resin (PF resin), melamine resin (MF resin), melamine/phenolic resin (MP resin), urea resin (UF resin), or the like.

The second plastic can be, for example, a thermoplastic elastomer, such as thermoplastic polyurethane (TPU), thermoplastic copolyester (TPEE), styrene-ethylene-butylene-styrene (SEBS), styrene-butadiene-styrene (SBS), polyether block amide (PEBA), or the like or a cross-linked elastomer such as polypropylene/ethylene-propylene-diene rubber (PP/EPDM), chloroprene rubber (CR), butadiene rubber (BR), or the like.

The first plastic can be, for example, a polyamide (PA) having a hardness greater than Shore D 35, while the second plastic is a styrene-ethylene-butylene-styrene (SEBS) having a hardness less than Shore D 35.

The first plastic can be, for example, a polyamide (PA) having a hardness greater than Shore D 54, while the second plastic is a thermoplastic polyurethane (TPU) having a hardness less than Shore D 54.

The first plastic can be, for example, a polycarbonate (PC) having a hardness greater than Shore D 35, while the second plastic is a styrene-ethylene-butylene-styrene (SEBS) having a hardness less than Shore D 35.

The first plastic can be, for example, a polycarbonate (PC) having a hardness greater than Shore D 54, while the second plastic is a thermoplastic polyurethane (TPU) having a hardness less than Shore D 54.

The first plastic can be, for example, a polycarbonate/acrylonitrile butadiene styrene (PC/ABS) having a hardness greater than Shore D 35, while the second plastic is a styrene-ethylene-butylene-styrene (SEBS) having a hardness less than Shore D 35.

The first plastic can be, for example, a polycarbonate/acrylonitrile butadiene styrene (PC/ABS) having a hardness greater than Shore D 54, while the second plastic is a thermoplastic polyurethane (TPU) having a hardness less than Shore D 54. The identification strip can be provided as a continuous material by co-extruding the first and the second plastic. Accordingly, the identification strip can, for example, be provided rolled onto a roll and fed to a corresponding printer. The identification strip can, in particular, be designed to be printed by way of a thermal transfer printer, an inkjet printer, a laser printer, or the like.

According to a further embodiment of the identification strip, the marking area has a first side having a cover surface to be printed, wherein an adhesion area of the marking area is formed on a second side facing away from the first side and/or an end face of the marking area. The identification strip can thus be reliably fastened without limiting the area available for printing symbols or characters.

In particular, the adhesion area of the marking area can be designed, in the fully mounted state, to lie against or to be latched onto a fastening object or fastening body in which a fastening groove is formed, such that the adhesion area lies on a surface of the fastening object or fastening body.

According to a further embodiment of the identification strip, the marking area has at least two or exactly two adhesion areas. To reliably position the identification strip, the marking area can be provided with an adhesion area, in particular on both sides, so as to increase static friction in the fully mounted state with respect to a fastening object or fastening body on which the identification strip is held.

The marking area can have a marking area to be printed, wherein the marking area comprises the first plastic and no area made of the second plastic.

The marking surface can consist of the first plastic.

The clamping area can have at least two or exactly two protruding projections, wherein at least one of the projections has an adhesion area. The projections serve, in particular, to engage in undercuts of the fastening groove in order, on the one hand, to establish a form-fitting connection and, in particular, to additionally allow the marking area and the clamping area to be braced against the groove. In the manner described above, the adhesion area serves to increase static friction of the identification strip in the fully mounted state with respect to a contact surface on which the adhesion area lies. A corresponding adhesion area can be formed on each of the projections.

The adhesion area of the projection can be arranged facing the marking area. This makes it easier to mount the identification strip when it is inserted into the groove, since the described arrangement of the adhesion area avoids contact between the adhesion area and lateral boundary surfaces when it is inserted into the groove, such that the adhesion area is only braced against a contact surface in the fully mounted state within the groove.

The projections of the clamping area can be formed integrally with the marking area, in particular, in the context of a co-extrusion as described, and, when viewed in a cross section, can extend, starting from the marking area, substantially diverging in a V-shape. In the present case, substantially diverging in a V-shape does not mean that the projections converge at a common point of the marking area, rather that the projections, starting from the marking area, move away from one another in a funnel-shaped widening. The projections are, in particular, arranged at a distance from one another on the marking area.

Alternatively or in addition, the projections each have an end section, at least sections of which are formed parallel to a width extension of the marking area. In this case, the width extension of the marking area, when viewed in a cross section, is oriented transversely to the longitudinal extension of the identification strip. The projections, sections of which are formed parallel to a width extension of the marking area, allow the projections to engage in an undercut of a groove in order to form a form-fitting connection to a groove.

In order to produce the identification strip simply and cost-effectively, the identification strip can alternatively or additionally be designed with mirror symmetry when viewed in a cross section. In this way, feeding to a printing device can also be facilitated.

According to a further embodiment of the identification strip, the adhesion area is arranged on a freely protruding end section of the projection. In particular, the adhesion area can accordingly be formed in an area which, in the fully mounted state, is resiliently braced against a surface of the fastening groove to ensure that the adhesion area lies against a contact surface of the fastening object to which the identification strip is fastened.

According to a further embodiment of the identification strip, the marking area has two adhesion areas and the clamping area has two adhesion areas, wherein the adhesion areas of the marking area are at a greater distance from one another than the adhesion areas of the clamping area. In this way, it can be ensured that the identification strip is reliably positioned under different load cases. Alternatively or in addition, an adhesion area of the marking area can be arranged facing an adhesion area of the clamping area. If, for example, the marking area and the clamping area are braced in the fully mounted state with their respective adhesion areas against a respectively associated contact surface of a fastening groove or the identification body having the groove, it can be ensured that each adhesion area is reliably in contact with a contact surface so as to increase static friction in the fully mounted state.

To allow the identification strip to be produced simply and cost-effectively, the adhesion area can consist of the second plastic and/or all areas of the identification strip that differ from the adhesion area can consist of the first plastic.

According to a further variant of the identification strip, the adhesion area has a shoulder or step in order to achieve a defined contact with a fastening body in a fully mounted state.

According to a second aspect, the invention relates to a marking system for an electrical installation, having an identification strip according to the invention and having a fastening body which has a fastening groove, wherein the clamping area of the identification strip engages in the fastening groove.

In particular, the clamping area of the identification strip can have projections which engage in an undercut of the fastening groove.

The marking area can lie on a wall of the fastening body that delimits the groove.

In particular, the identification strip can be braced against or latched to the fastening body, wherein the clamping area lies, in particular with protruding projections, against an undercut of the fastening groove and the marking area lies, with a side facing away from the cover surface of the marking area, on a side wall of the fastening body that delimits the fastening groove such that the identification strip is resiliently braced against or latched to the fastening body.

In particular, each area, i.e. both the clamping area and the marking area, has one or more adhesion areas that lie on an associated contact surface of the fastening body so as to increase static friction and to prevent or counteract movement of the identification strip within the fastening groove.

To provide the largest possible marking surface, the marking area can have a width which exceeds the total width of the fastening body and projects beyond the fastening body, in particular on both sides.

According to a third aspect, the invention relates to a method for producing an identification strip for an electrical installation, wherein the identification strip is designed in the manner according to the invention, comprising the method steps of: plasticizing the first and the second plastic, and co-extruding the first and the second plastic in such a way that the adhesion area is a strand that is integrally bonded and/or connected in a form-fitting manner to the other areas of the marking area and/or the clamping area.

In this way, the identification strip can be provided in a simple and cost-effective manner as a continuous material in the co-extrusion process. In particular, the identification strip has four adhesion areas, each of which is formed as a strand that is integrally bonded to the clamping area and the marking area.

In particular, as a result of the production in the co-extrusion process, the identification strip has a constant cross section, when viewed along the longitudinal extension thereof, which corresponds to the extrusion direction.

As an alternative to co-extrusion, continuous injection molding, or two-component injection molding, or extrusion can be used to produce the identification strip. Alternatively or additionally, the first and second components can initially be provided separately, in particular extruded, and then connected to one another.

The invention is described below with the aid of drawings which show several embodiments, in which, schematically:

FIG. 1 shows an identification strip 2 for an electrical installation, which is provided as a continuous material, as indicated by the freehand cutting line.

The identification strip 2 has a marking area 4 that is designed to be printed by way of a printing device. The identification strip 4 has a clamping area 6 that is designed to engage in a fastening groove.

To make the following statements easier to understand, a Cartesian coordinate system is introduced, wherein a longitudinal extension of the identification strip 2 is oriented or measured along the x-axis, a width of the identification strip 2 is oriented or measured along the y-axis, and a height of the identification strip 2 is oriented or measured along a Z direction.

Figure 1:
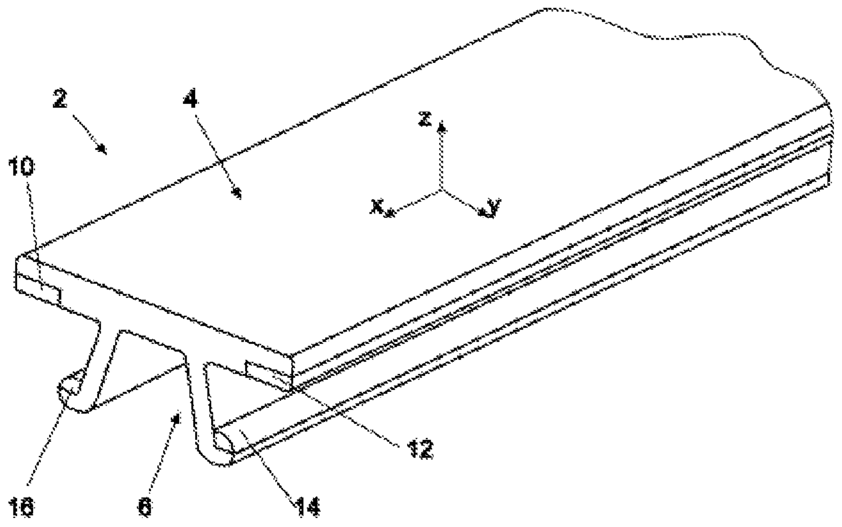
FIG. 1 shows a first identification strip according to the invention in a perspective view from above.
Figure 2:
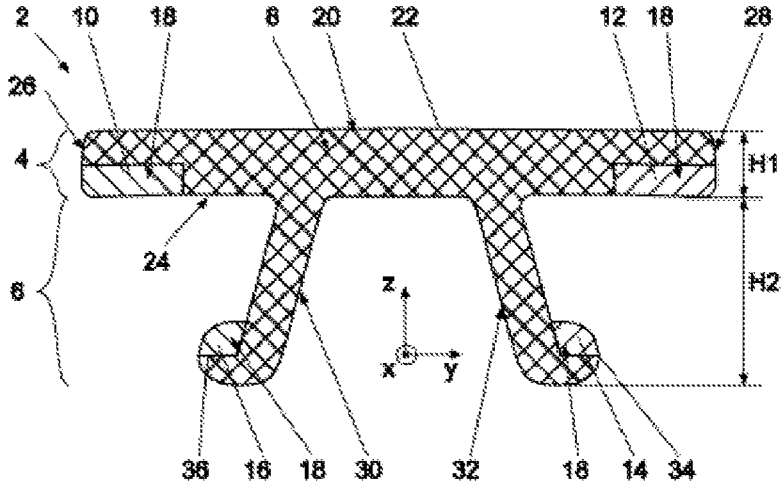
FIG. 2 shows the identification strip from FIG. 1 in a cross section.

Accordingly, the marking area 4 extends over a height H1, while the clamping area 6 has a height H2 (FIG. 2). The total height of the identification strip is thus the sum of the heights H1 and H2.

The marking area 4 and the clamping area 6 comprise a first plastic 8, which is illustrated by the cross-hatching of the cross section shown in FIG. 2.

The marking area 4 and the clamping area 6 each have adhesion areas 10, 12, 14, 16 which are each formed from a second plastic 18, as shown in FIG. 2 by the hatching of the respective adhesion areas 10, 12, 14, 16.

The second plastic 18 is more flexible than the first plastic 8 so as to increase static friction and accordingly forms slip protection or prevents slip for the completely mounted state.

The marking area 4 has a first side 20 having a cover surface 22 to be printed. The adhesion areas 10, 12 of the marking area 4 are formed on a second side 24 facing away from the first side 20 and on the end faces 26, 28 connecting the first side 20 and the second side 24.

In the present case, the marking area 4 has exactly two adhesion areas 10, 12, which are integrally bonded to the adjoining material 8 as co-extruded strands 10, 12.

The clamping area 6 has two projections 30, 32 protruding from the marking area 4. A particular adhesion area 14, 16 is arranged on each of the projections 30, 32. The projections 30, 32 are formed integrally with the marking area 4 by co-extrusion and, when viewed in the cross section shown in FIG. 2, extend, starting from the marking area 4, substantially diverging in a V-shape.

The projections 30, 32 each have an end section 34, 36, at least sections of which are formed parallel to a width extension along the y-axis of the marking area 4. The adhesion areas 14, 16 sit on the end sections 34, 36. The adhesion areas 14 and 16 are accordingly formed on the freely protruding end sections 34, 36 of the projections 30, 32.

The adhesion areas 10, 12 of the marking area 4, when viewed in the Y direction, are at a greater distance from one another than the adhesion areas 14, 16 of the clamping area 6. The adhesion areas 10, 12 are arranged facing the adhesion areas 14, 16.

In the present case, the adhesion areas 10, 12, 14, 16 consist of the second plastic 18, while all areas of the identification strip different from the adhesion areas 10, 12, 14, 16 consist of the first plastic 8.

Figure 3:
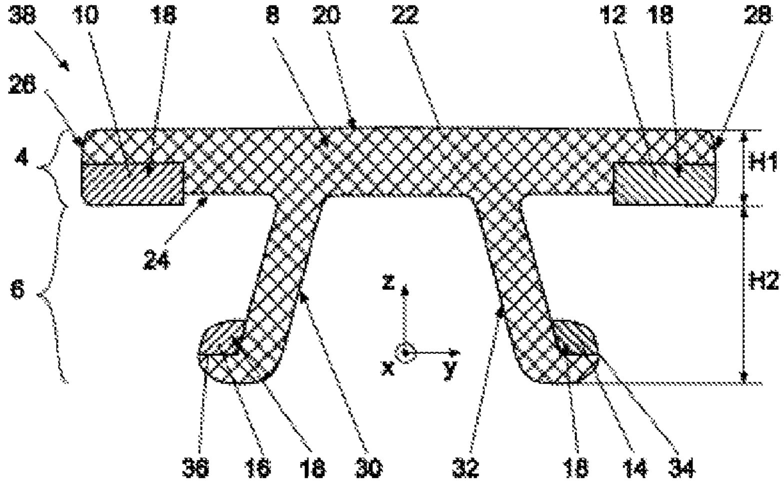
FIG. 3 shows a further identification strip according to the invention in a cross section.

FIG. 3 shows a further variant of an identification strip 38 according to the invention in a cross section, wherein only the differences from the embodiment described above are discussed in order to avoid repetition, and the same features are assigned the same reference symbols. The identification strip 38 differs from the embodiment in FIG. 2 in that the adhesion areas 10, 12 are offset or stepped with respect to the adjoining material 8 of the marking area 4, such that a shoulder or step is formed.

Figure 4:
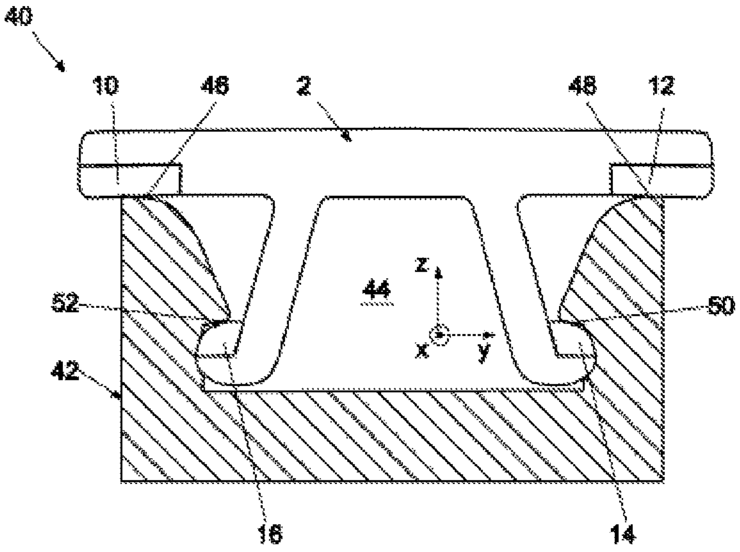
FIG. 4 shows the identification strip from FIGS. 1 and 2 in a fully mounted state.

FIG. 4 shows the identification strip 2 in a fully mounted state. FIG. 4 thus describes a marking system 40 according to the invention for an electrical installation, wherein the identification strip 2 is fastened to a fastening body 42 and wherein the clamping area 6 of the identification strip 2 engages in a fastening groove 44 of the fastening body 42.

In the present case, the adhesion areas 10, 12, 14, 16 of the identification strip 2 are each braced against contact surfaces 46, 48, 50, 52 of the fastening body 42. In this way, the identification strip 2 can be reliably fastened to the fastening body 42 in that the adhesion areas 10, 12, 14, 16 increase static friction during contact with the fastening body 42. This also applies to the illustration shown in FIG. 5, in which identification strips 38 known from FIG. 3 are received in the corresponding fastening groove so as to produce a further marking system 54 according to the invention for an electrical installation.

Figure 6:
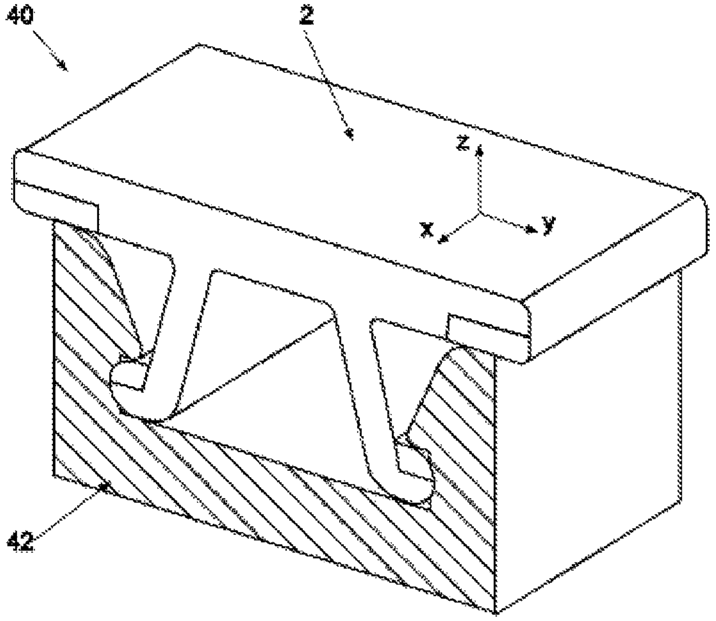
FIG. 6 shows the identification strip from FIGS. 1 and 2 in a fully mounted state in a perspective view from above.

In order to further clarify the structural configuration of the marking system 40 according to the invention from FIG. 4, FIG. 6 shows a perspective view from above, which shows the identification strip 2 in the fully mounted state on the fastening body 42.

Figure 5:
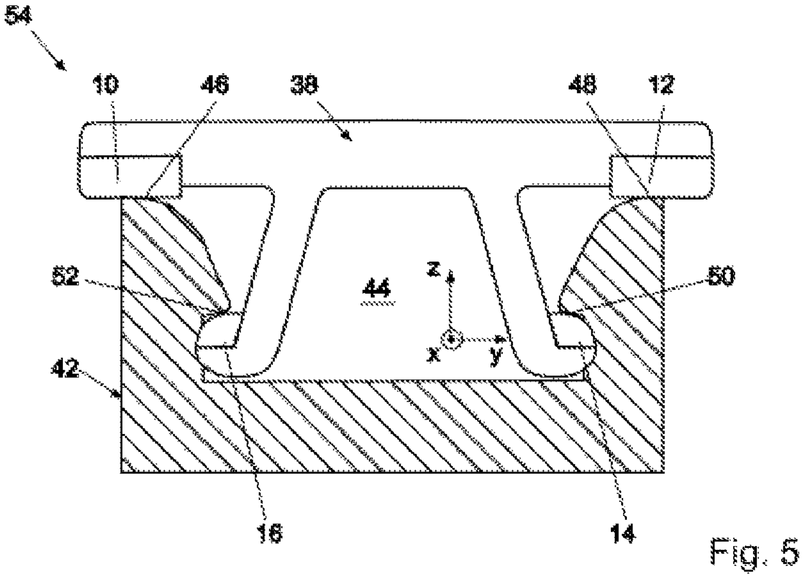
FIG. 5 shows the identification strip from FIG. 3 in a fully mounted state.

In FIG. 4-6, hatching of the identification strip in question has been omitted to improve clarity and to clarify the relative arrangement on the associated fastening body.

Figure 7:
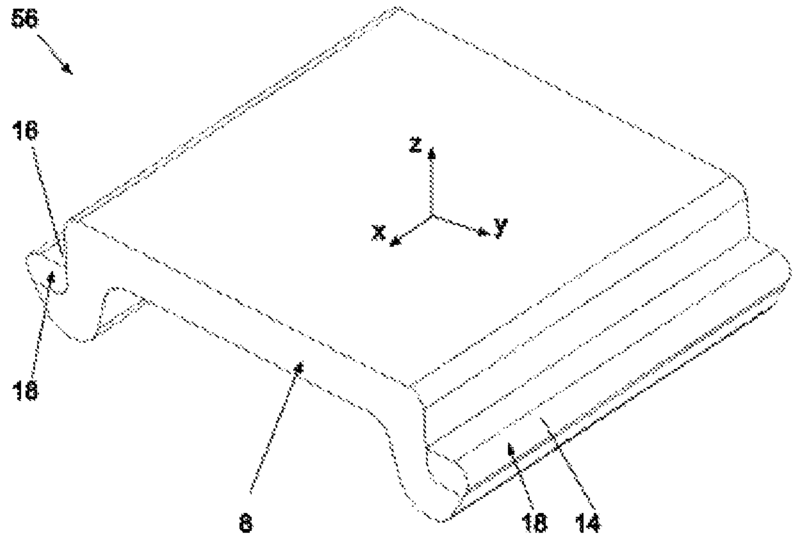
FIG. 7 shows a further identification strip according to the invention in a perspective view from above.
Figure 8:
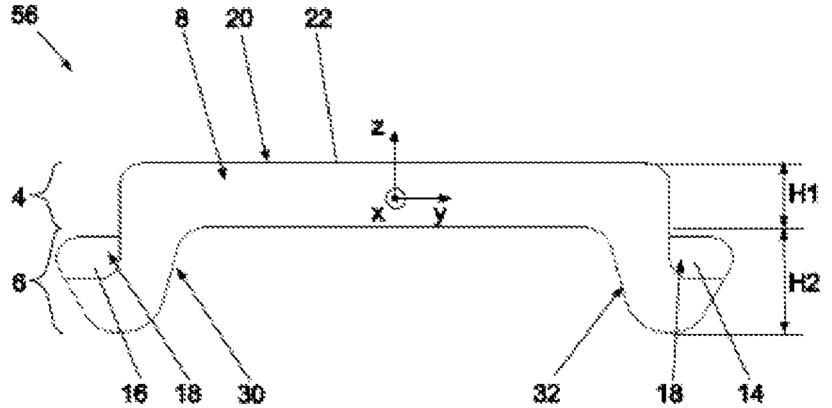
FIG. 8 shows the identification strip from FIG. 7 in a front view.

FIGS. 7 and 8 show a further identification strip 56 for an electrical installation, which can be provided as a continuous material.

The identification strip 56 has a marking area 4 that is designed to be printed by way of a printing device. The identification strip 4 has a clamping area 6 that is designed to engage in a fastening groove.

To make the following statements easier to understand, a Cartesian coordinate system is introduced, wherein a longitudinal extension of the identification strip 56 is oriented or measured along the x-axis, a width of the identification strip 2 is oriented or measured along the y-axis, and a height of the identification strip 2 is oriented or measured along a Z direction.

Accordingly, the marking area 4 extends over a height H1, while the clamping area 6 has a height H2 (FIG. 8). The total height of the identification strip is thus the sum of the heights H1 and H2.

The marking area 4 and the clamping area 6 comprise a first plastic 8. The clamping area 6 has adhesion areas 14, 16 which are each formed from a second plastic 18. The second plastic 18 is more flexible than the first plastic 8 so as to increase static friction and accordingly forms slip protection or prevents slip for the fully mounted state.

The marking area 4 has a first side 20 having a cover surface 22 to be printed.

The clamping area 6 has two projections 30, 32 protruding from the marking area 4. A particular adhesion area 14, 16 is arranged on each of the projections 30, 32. The projections 30, 32 are formed integrally with the marking area 4 by co-extrusion.

In the present case, the adhesion areas 14, 16 consist of the second plastic 18, while all areas of the identification strip 56 different from the adhesion areas 14, 16 consist of the first plastic 8.

REFERENCE SIGNS

2 Identification strip
4 Marking area
6 Clamping area
8 First plastic
10 Adhesion area
12 Adhesion area
14 Adhesion area
16 Adhesion area
18 Second plastic
20 First side
22 Cover surface
24 Second side
26 End face
28 End face
30 Projection
32 Projection
34 End section
36 End section
38 Identification strip
40 Marking system
42 Fastening body
44 Fastening groove
46 Contact surface
48 Contact surface
50 Contact surface
52 Contact surface
54 Marking system
56 Identification strip
H1 Height
H2 Height

The invention claimed is:

1. Identification strip for an electrical installation, having a marking area that is designed to be printed by way of a printing device, having a clamping area comprising protruding projections that are designed to engage in a fastening groove, the marking area, the clamping area, and the protruding end sections of the protruding projections comprising a first plastic, wherein the marking area and/or the clamping area has/have at least one adhesion area that comprises a second plastic, the second plastic being more flexible than the first plastic so as to increase static friction, characterized in that the marking area has a first side having a cover surface to be printed, an adhesion area of the marking area being formed on a second side facing away from the first side and/or on an end face of the marking area.

2. Identification strip according to claim 1, characterized in that the marking area has at least two or exactly two adhesion areas and/or the marking area has a marking surface to be printed, which consists of the first plastic.

3. Identification strip according to claim 1, characterized in that the clamping area has exactly two of the protruding projections, at least one of the projections having an adhesion area.

4. Identification strip according to claim 3, characterized in that the adhesion area of the projection is arranged facing the marking area.

5. Identification strip according to claim 3, characterized in that the projections are formed integrally with the marking area and, when viewed in a cross section, extend, starting from the marking area, substantially diverging in a V-shape and/or the projections each have an end section, at least sections of which are formed parallel to a width extension of the marking area and/or the identification strip is formed with mirror symmetry when viewed in a cross section.

6. Identification strip according to claim 3, characterized in that the adhesion area is arranged on a freely protruding end section of the projection.

7. Identification strip for an electrical installation, having a marking area that is designed to be printed by way of a printing device, having a clamping area comprising protruding projections that are designed to engage in a fastening groove, the marking area, the claiming area, and the protruding end sections of the protruding projections comprising a first plastic, wherein the marking area and/or the clamping area has/have at least one adhesion area that comprises a second plastic, the second plastic being more flexible than the first plastic so as to increase static friction, characterized in that the marking area has two adhesion areas and the clamping area has two adhesion areas, the adhesion areas of the marking area being at a greater distance from one another than the adhesion areas of the clamping area and/or an adhesion area of the marking area is arranged facing an adhesion area of the clamping area.

8. Identification strip according to claim 1, characterized in that the adhesion area consists of the second plastic and/or all areas of the identification strip different from the adhesion area consist of the first plastic.

9. Identification strip for an electrical installation, having a marking area that is designed to be printed by way of a printing device, having a clamping area comprising protruding projections that are designed to engage in a fastening groove, the marking area, the clamping area, and the protruding end sections of the protruding projections comprising a first plastic, wherein the marking area and/or the claiming area has/have at least one adhesion area that comprises a second plastic, the second plastic being more flexible than the first plastic so as to increase static friction, characterized in that the adhesion area has a shoulder or step.

10. Marking system for an electrical installation, having an identification strip according to claim 1 and having a fastening body that has a fastening groove, the clamping area of the identification strip engaging in the fastening groove.

11. Method for producing an identification strip for an electrical installation, wherein the identification strip is designed according to claim 1, comprising the method steps of: plasticizing the first and second plastic, co-extruding the first and the second plastic in such a way that the adhesion area is a strand that is integrally bonded and/or connected in a form-fitting manner to the other areas of the marking area and/or the clamping area.

* * * * *